United States Patent Office

3,453,253
Patented July 1, 1969

---

3,453,253
METHOD OF SELECTIVELY EXTRACTING THE ALKALI METAL SALTS OF TALL OIL FATTY AND RESIN ACIDS FROM ALKALINE BLACK LIQUOR
David L. Brink, Berkeley, Calif., assignor to The Regents of the University of California
No Drawing. Filed Sept. 8, 1966, Ser. No. 577,801
Int. Cl. C09f 1/02, 5/02
U.S. Cl. 260—97.6
8 Claims

ABSTRACT OF THE DISCLOSURE

Alkaline black liquor is subjected directly to an alcoholic solvent which is only partially miscible with water. Separation of aqueous and organic phases is allowed to occur, resulting in tall oil components in the black liquor being preferentially retained in the solvent phase from such components are recovered.

---

This invention relates to the selective extraction of tall oil fatty and resin acid salts from alkaline black liquor.

As is well known, black liquor is a liquid product resulting from the alkaline processes of wood pulping, i.e. the kraft and soda processes. Black liquor resulting from the pulping of resinous woods, such as pines, comprises water containing various organic products solubilized or dissolved from the wood, including tall oil soaps. Crude isolated tall oil is a black, sticky, viscous liquid composed mainly of $C_{10}$–$C_{20}$ fatty acids and resin acids. Such crude tall oil has wide commercial utility in the manufacture of tall oil fatty acids, tall oil rosin, soaps, greases and in the preparation of emulsions.

Various methods have been disclosed for the recovery of salts of organic acids from black liquor, such as those described in the patents to Sandborn et al., Nos. 2,750,412 and 2,750,413, both dated June 12, 1956: However, in the methods of these patents, there is no selective extraction by phase separation of the salts (i.e. alkali metal soaps) of fatty and resin acids of tall oil, from black liquor derived from resinous woods, whereby a liquid medium is obtained which is rich in tall oil fatty and resin acid salts, from which tall oil can be readily recovered by conventional tall oil recovery methods.

The invention hereof has as a principal object, among others, the provision of an improved simple and economical method whereby such tall oil fatty and resin acid salts (hereinafter generically designated as tall oil components) can be extracted selectively from black liquor containing such components, which method can be performed rapidly and with a minimum of loss, and which utilizes economical extracting mediums. Other objects of the invention will become apparent from the following more detailed description.

Pursuant to this invention, it has been found that if the alkaline black liquor is subjected directly to an alcohol which is not substantially completely soluble in or miscible with water but is only partially miscible with or soluble in water, and separation of aqueous and organic phases is allowed to occur, the tall oil components contained in the black liquor are selectively extracted from the black liquor and retained in the alcohol, leaving substantially in the aqueous phase such degradation products of the wood, as sodium acetate, sodium formate, and sodium salts of degraded carbohydrates and of lignins normally occurring in black liquor. In this connection, the extent of partial miscibility of the alcohol with water is immaterial, as long as separation into two liquid phases will occur.

Alcohols, or mixtures thereof, which are particularly suitable for the method hereof are the $C_4$–$C_5$ alcohols, such as normal, secondary and isobutyl alcohols; and normal primary, active primary, primary iso, normal secondary, and tertiary amyl alcohols. Synthetic amyl alcohol ("Pentasol" by Sharples Chemicals Div., Pa. Salt Manufacturing Co.), or amyl alcohol from fusel oil, are also suitable.

The method is effected by subjecting the black liquor to a sufficient quantity of the alcohol which is only partially miscible with water, thoroughly commingling or intermixing the solvent and aqueous phases, allowing the solvent phase to separate from the aqueous phase to form two distinct phases, and then removing the solvent phase containing the tall oil components, from the aqueous phase. The method can be conducted as a batch process by repeatedly subjecting a given quantity of the black liquor to successive quantities of the alcohol until substantially all of the tall oil components have been extracted, or as a continuous process by conventional counter-current extraction.

Any black liquor resulting from alkaline cellulosic pulping processes and containing tall oil components can be used. Its solids content may vary from about 12.5 to 20% by weight which is normally contained in the stream fed to the evaporators in a pulping plant, about 20 to 45% by weight which is normally contained in the stream during evaporation, or from 45 to 60% by weight which is normally contained in the stream of concentrated black liquor after evaporation. Even more concentrated black liquor can be used, namely, substantially dry solids, such as obtained by spray drying in which event water should be added. In general, the method can be advantageously conducted with a concentration of solids in the black liquor ranging from about 12.5 to 65% by weight.

The temperature at which the extraction is conducted is relatively immaterial, but the rate of extraction is favored at elevated temperatures and desirably such temperatures of extraction is about 40° to 95° C. However, lower temperatures may be employed, such as ambient temperature but the rate of extraction will be slower; and it is desirable to conduct the extraction below the boiling point of the alcohol-water binary which governs the maximum temperature at atmospheric pressure. Extraction under pressure can also be employed at higher temperatures depending on the particular pressure.

The quantity of the alcohol employed in the extraction and the manner used in bringing the alcohol and aqueous black liquor phases into contact will determine the rate of extraction. Efficient extraction will normally require at least ½ to 20 volumes of the alcohol to 1 volume of black liquor. The maximum amount of alcohol used is governed by economics because although a large excess of alcohol will effect more complete extraction, excessive usage of alcohol will increase expense in the extraction of the black liquor, recovery of the alcoholic phase, and isolation of the tall oil components from the alcoholic phase.

After extraction with the alcohol has been completed, the tall oil components can be recovered from the removed alcoholic extract by conventional procedures; as, for example, by acidifying with sulfuric acid to a pH less than about 3.5, desirably in the range of pH 1 to 2, allowing separation to occur between the alcoholic layer containing the tall oil components in acidic form and whatever aqueous phase is present stripping off the alcoholic phase by conventional distillation methods, and then recovering the crude tall oil from the residue by conventional methods of distillation. The tall oil products can then be used for the various purposes, among others, noted previously.

Example I

The following is a typical example illustrative of an embodiment of the invention. In the example, a black liquor resulting from a kraft full chemical treatment of a mixture of pine, true firs and Douglas fir woods was employed, containing 14.55% by weight solids and having a specific gravity of 1.05. The amount of ether extractables (essentially free acids extractable for acidified black liquor of ether) in such black liquor, which is conventionally used as a measure of the amount of of tall oil, was determined on an aliquot of the black liquor, by conventional procedure wherein such aliquot was acidified with sulfuric acid ($H_2SO_4$) to a pH of 1.5, exhaustively extracted with ether, and the total solids in the ether determined by evaporation. It was found that the black liquor contained 1.298% by weight of such ether extractables. A second aliquot of 106.5 grams of the black liquor was utilized in the example. Thus, there were 1.38 grams of ether soluble organics in the second black liquor aliquot used (106.5 grams of black liquor $\times$ 0.1298).

The alcohol employed for the extraction was water saturated secondary butanol (s-butyl alcohol) containing about 65% by weights-butanol and about 35% by weight water. The extraction was initiated with the 106.5 grams of the black liquor; and 85.0 grams of the water saturated s-butanol were added to the black liquor in a flask. The mixture was stirred for about one hour to cause thorough intermixing of the aqueous and alcoholic phases, and thus enhance extraction; and during this period the flask was maintained at a temperature of 60° C.

After such intermixing, the mixture was transferred to a separate funnel and allowed to stand until it had separated into two distinct phases which occurred relatively fast, in about 20 minutes. The distinct butanol phase was then removed from the aqueous phase, namely, the raffinate.

After such first extraction, the same procedure was repeated four additional times on the respective aqueous (raffinate) phases from the same sample, with approximately 85 grams of the fresh water-saturated s-butanol added each time. After such five extractions, the amount of ether extractables was determined in the entire raffinate from the five extractions by the aforementioned conventional method comprising acidification with sulfuric acid to a pH of 1.5, and was determined to be 0.52 gram compared to the 1.38 grams of ether extractables in the original aliquot. Thus, 0.86 gram were extracted by the s-butanol, or approximately 62% (0.86÷1.38) even though the volume ratio of s-butanol to black liquor was relatively low.

Example II

One kilogram (1,000 grams) of the same black liquor used in Example I was concentrated to 250 grams, thus providing a solids content of approximately 58.2% by weight. Since such black liquor contained 1.298% by weight of ether extractables as explained in Example I, there were 12.98 grams of ether extractable organics present (1.298% of ether extractables in 1,000 grams).

Such 250-gram sample of black liquor was extracted 5 times as in Example I and under the same conditions with approximately 800 grams of the alcohol solvent each time but the first two extractions were with anhydrous secondary butyl alcohol, and the last three with water-saturated secondary butyl alcohol (35% by weight water); and the amount of each butanol phase separated was determined, and analyzed for butanol extracted solids obtained by evaporation. The following table indicates the results:

TABLE

| Extraction | Amount of s-butanol phase separated each extraction, grams | Solids in s-butanol phase separated each time, grams |
| --- | --- | --- |
| 1 | 749 | 5.26 |
| 2 | 728 | 2.31 |
| 3 | 864 | 2.16 |
| 4 | 793 | 1.78 |
| 5 | 802 | 1.65 |
| Total | | 13.16 |

The total aggregate of 13.16 grams of solids in all the butanol extracts were in the form of sodium salts (containing by analysis about 10% by weight sodium) resulting from the presence of the predominant sodium cation inherently occurring in the salts of organic acids in the alkaline black liquor. Therefore, the organic solids extracted, calculated as free acids, amounted to 0.9 of the 13.16 grams, namely, 11.84 grams, compared with the 12.98 grams of ether extractables in the sample or about 91%.

The solids extracted by the butanol were analyzed by the gas-liquid chromatographic method, as explained in an article by F. H. M. Nestler and D. F. Zinkel in Analytical Chemistry, 35(11)1747–1749 (October 1963), and also in an article by E. Abrams in Tappi 46(2):136A–139A (February 1963); and by such analysis it was found that such butanol extracted solids contained substantially all of the major components of tall oil, namely, the resin and the fatty acids. Hence, with the substantially concentrated black liquor employed in Example II, substantially all of the tall oil components in the black liquor were extracted in 5 extraction.

I claim:
1. The method of selectively extracting tall oil components comprising both tall oil fatty acid and resin acid salts from alkaline black liquor, which comprises, as a primary step, subjecting an aqueous solution of said black liquor directly to contact with an alcoholic solvent consisting essentially of alcohol which is only partially miscible with water to thus form initially an aqueous phase and a solvent phase whereby preferential solution and retention of said tall oil components is effected in said solvent phase and wood degradation products including sodium acetate and sodium formate are left substantially in said aquous phase, allowing separation of said solvent phase from said aqueous phase, and removing said solvent phase containing said tall oil components for recovery of tall oil components therefrom.

2. The method of claim 1 wherein the alcohol is a $C_4$–$C_5$ alcohol.

3. The method of claim 1 wherein the extraction is effected at ambient temperature up to about 95° C.

4. The method of claim 3 wherein the temperature of extraction is about 40 to 95° C.

5. The method of claim 1 wherein the solids content of the black liquor is about 12.5% to 65% by weight.

6. The method of claim 2 wherein the aqueous and solvent phases are thoroughly intermixed before said solvent phase is allowed to separate.

7. The method of claim 6 wherein the intermixing is effected at ambient temperature up to about 95° C.

8. The method of claim 6 wherein the solids content of the black liquor is about 12.5 to 65% by weight.

References Cited

UNITED STATES PATENTS 2,285,902 6/1942 Christmann et al. ___ 260—97.6
2,750,412 6/1956 Sandborn et al. _____ 260—542

DONALD E. CZAJA, Primary Examiner.

W. E. Parker, Assistant Examiner.

U.S. Cl. X.R.

260—527